March 16, 1926.

J. SMITH

MOVABLE HEADLIGHT

Filed Oct. 29, 1924

James Smith
INVENTOR

BY Victor J. Evans
ATTORNEY

March 16, 1926.

J. SMITH

MOVABLE HEADLIGHT

Filed Oct. 29, 1924

James Smith
INVENTOR

BY Victor J. Evans
ATTORNEY

Patented Mar. 16, 1926.

1,577,379

UNITED STATES PATENT OFFICE.

JAMES SMITH, OF DONORA, PENNSYLVANIA.

MOVABLE HEADLIGHT.

Application filed October 29, 1924. Serial No. 746,586.

*To all whom it may concern:*

Be it known that I, JAMES SMITH, a subject of the King of Great Britain, residing at Donora, in the county of Washington and State of Pennsylvania, have invented new and useful Improvements in Movable Headlights, of which the following is a specification.

My present invention has reference to dirigible headlights for automobiles or like vehicles.

My object is to provide a novel means for mounting the headlamps of an automobile and for causing the same to be automatically turned to follow the angles taken by the steering wheels of the machine so that the rays from the lamps will at all times follow the direction taken by the machine.

With the above broadly stated objects in view and others which will appear as the nature of the invention is better understood, the improvement resides in the details of construction, combination and operative association of parts, a satisfactory embodiment of which being disclosed by the accompanying drawings.

In the drawings:—

Figure 1:
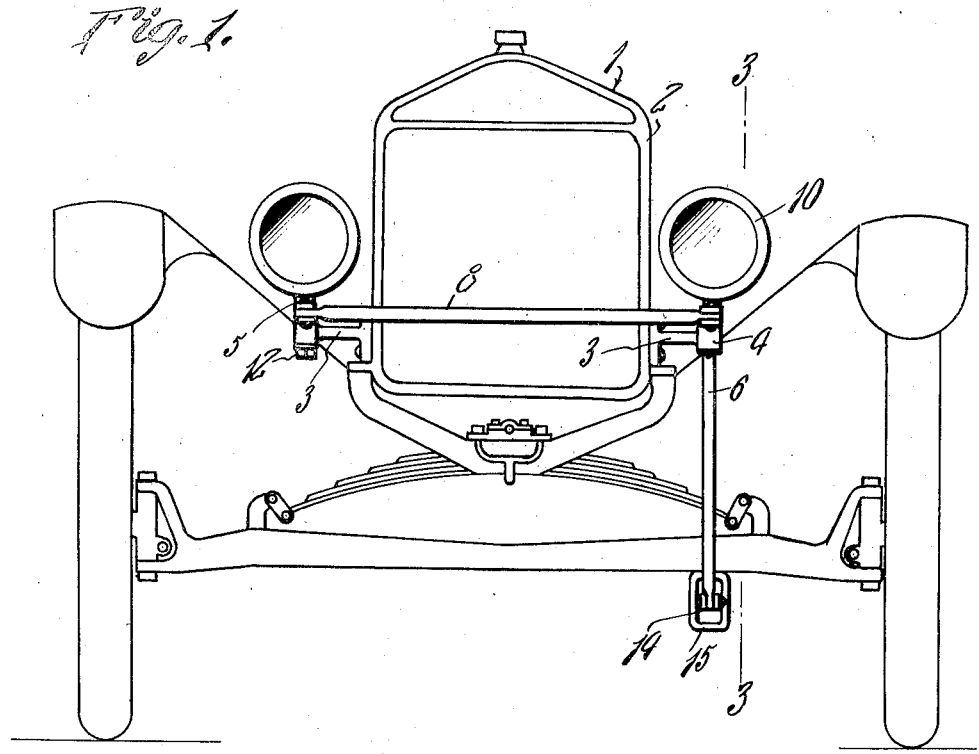
Figure 1 is a front elevation of an automobile provided with the improvement.
Figure 2:
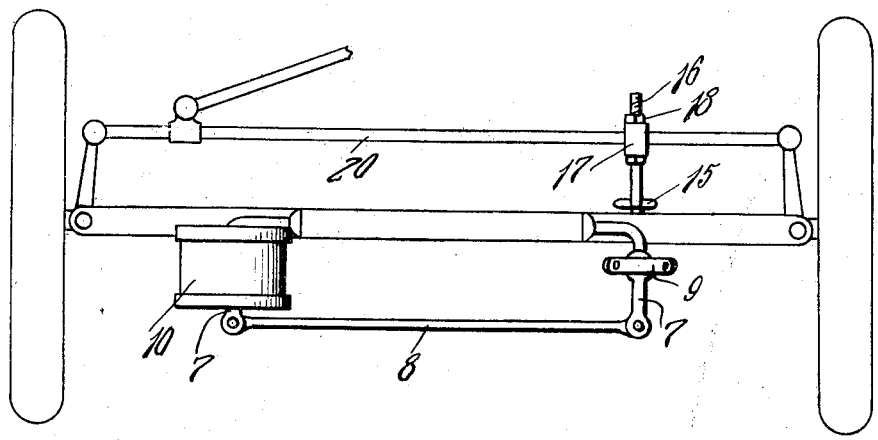
Figure 2 is a top plan view thereof, one of the headlamps being removed.
Figure 3:
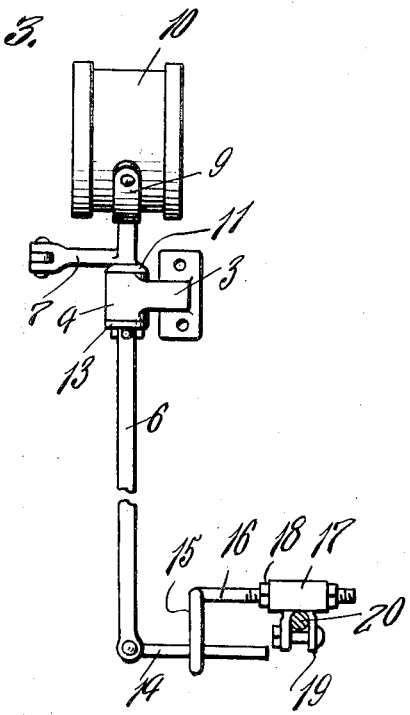
Figure 3 is a sectional view of the improvement, taken approximately on the line 3—3 of Figure 1.
Figure 4:
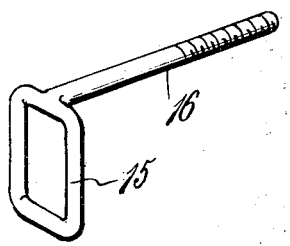
Figure 4 is a perspective view of the yoke member employed.

In the drawings the numeral 1 designates a sufficient portion of an automobile to illustrate the application of my improvement thereon. In carrying out my invention, I secure to the sides of the radiator frame 2 outstanding brackets 3, each of which terminating in vertically disposed hubs 4. The arms of the brackets to which the hubs are secured are rounded outwardly, as clearly shown in Figure 2 of the drawings, and the hubs have journaled therethrough posts 5 and 6 respectively. Each of the posts has an outstanding arm 7, the arms having their outer ends bifurcated to receive therebetween and have pivoted therein a connecting rod 8. The posts have their ends formed with U-shaped brackets 9 to receive therein and have secured thereon the headlamp casings 10. The posts, directly below their outstanding arms 7 are flanged, as at 11, the said flanges resting directly on the hubs 4. If desired, suitable antifrictional bearings may be provided between the flanges and the hubs.

The post 5 is comparatively short, having the end thereof which extends through the hub 4 threaded for the reception of a nut 12, while the post 6 extends a suitable distance below its hub 4, means 13, however, holding the said post 6 from upward movement through the hub.

Pivotally secured to the lower end of the post 6 there is an inwardly directed rod 14 and this rod is received through a substantially rectangular yoke 15 that is formed with a rearwardly extended threaded rod 16. The rod 16 passes through the bore in the barrel or hub portion 17 of a clamp, nuts 18 being secured on the rod and contacting with the opposite ends of the barrel. The barrel is provided with a pair of spaced depending fingers 19 that receive therebetween the steering knuckle connecting rod 20 of the automobile, securing means such as a nut and bolt passing through the fingers for holding the clamp on the rod 20.

The yoke 15 freely receives the rod 14 therethrough, and as the latter is pivoted to the post 6, a yielding between the body and the frame of the automobile will not affect the headlamps, nor the mountings therefor. However, when the steering wheel is operated to turn the steering wheels, the side arms of the yoke will contact with the rod 14, swinging the same horizontally to impart a like swinging to the post 6 and the latter, incident to its connection 8 with the post 5, will impart a similar swinging to the said post. Thus the headlights will be turned simultaneously with and in the direction of the steering wheels, so that the rays of light will at all times be directed straight ahead of the machine in the course it is taking.

Figure 5:
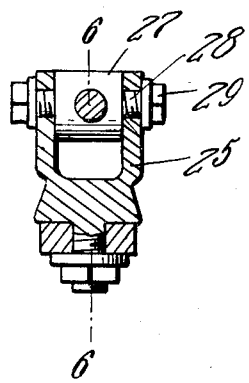
Figure 5 is a sectional view of a modified form of the invention and is taken approximately on the line 5—5 of Figure 6.
Figure 6:
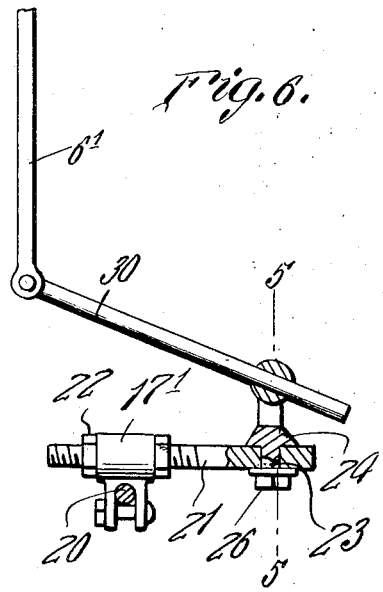
Figure 6 is a sectional view approximately on the line 6—6 of Figure 5.

In Figures 5 and 6 I have illustrated a slight modification. In these views, I have dispensed with the yoke 15 and have attached to the barrel 17' of the steering knuckle connecting rod engaging clip a threaded rod 21. This rod is held adjusted in the clip through the medium of nuts 22 that contact with the opposite ends of the barrel 17'. The rod 21 has its outer end flattened and is provided with an opening for the reception of the threaded pintle 23 formed on the shouldered portion 24 of a bifurcated member 25. The threaded pintle is engaged by a nut 26. Pivoted between the arms of the bifurcated member 25 there is a roller member 28. The pivots for the roller are in the nature of trunnions which are preferably integrally formed with the said roller, the said trunnions being threaded and being engaged by nuts 29. The roller 27 has a central opening therethrough for the free passage of a rod 30, similar to the rod 14, the said rod 30 being pivotally secured to the lamp supporting post 6', similar to the post 6. With this construction it will be also noted that vertical movement between the body and the frame of the automobile will not affect the headlamps nor the supporting means therefor, but it will be obvious that a lateral movement of the knuckle connecting rod will impart a swinging movement to the lamps.

Having described the invention, I claim:—

In combination with an automobile, of means for causing the headlamps thereof to turn with and in the same direction as the steering wheels, comprising curved brackets secured to the sides of the radiator and terminating in outwardly directed hubs, a lamp supporting post journaled in each hub, each of said posts having an outstanding arm, a rod to which the arms are pivotally secured, one of said posts being of a greater length than the other, a rod pivotally secured to the lower end of the longer post to permit of the vertical but to prevent the side movement thereof, a barrel having spaced depending fingers which are clamped on the steering knuckle connecting rod of the machine, a rod movable through the barrel and adjustably sustained thereon, and a loose connection between the pivoted rod and the last mentioned rod whereby the pivoted rod will be swung upon the lateral movement of the knuckle connecting rod to impart a simultaneous swinging to the lamp supporting posts.

In testimony whereof I affix my signature.

JAMES SMITH.